United States Patent Office 3,794,499
Patented Feb. 26, 1974

3,794,499
ARTIFICIAL FEED FOR DOMESTIC SILKWORMS
Minoru Shirota, Tetsuo Fukuda, and Mayumi Ogata, Kyoto, and Hiromi Yamada, Uji, Japan, assignors to Kabushiki Kaisha Yakult Honsha, Tokyo, and Hiromi Yamada, Uji, Japan
No Drawing. Filed Dec. 22, 1971, Ser. No. 211,035
Claims priority, application Japan, Dec. 24, 1970, 45/116,747
Int. Cl. A23k 1/18
U.S. Cl. 426—210            2 Claims

ABSTRACT OF THE DISCLOSURE

The disclosed feed includes a known artificial feed containing a powder of mulberry leaf and a unicellular green alga such as a chlorella or scenedesmus in an amount of at least 30% based upon the total weight of the feed.

BACKGROUND OF THE INVENTION

This invention relates to improvements in artificial feed compositions for domestic silkworms.

It is well known that from ancient times domestic silkworms, that is, larval or caterpillars of a silkmoth (Bombyx mori) are reared for the purpose of producing cocoons and reeling raw silk filaments off the cocoons until the sericulture has been already settled as one part of the agricultural industry. On the other hand, with the progress of polymer chemistry, synthetic fibers have much increased in output. However, the increased output of the synthetic fibers only accounts for 30 percent of the total output of all textile fibers and the textile industry still relies greatly upon natural fibers. Among the natural fibers, silk fibers or filaments have an output amounting only to 0.2 percent of the total output of textile fibers but it is noted that, in spite of a great increase in output of synthetic fibers, the figure just mentioned for the silk filaments characteristically remains steady. Particularly the unique beauty exhibited by the silk filaments will continue to be consistently pursued in the future. And now, in Japan the recent status of rural areas tends to be increasingly unfitted for the sericulture collectively consuming great labor and accordingly a cocoon crop decreases steadily. This reflects on a tendency to reduce the production of silk on a world-wide scale. On the other hand the domestic demand for silks is very strong and also the world-wide demand therefor does not appreciably decrease leading to a very strong demand for an increase in cocoon crop.

Under these circumstances, it is an urgent necessity to promote an increase in cocoon crop by any means. One approach to this will be to rid the sericulture of dependency upon fresh mulberry leaves. The conventional sericulture has depended upon such leaves because it has been difficult to separate the culture of a mulberry (morus bombycis) from the silkworm rearing. If the use of artificial feeds containing dried mulberry leaves permits the storage and transport of the feed for the silkworm then the sericultural industry as a whole can save much time and labor as compared with the prior art practice. Doing so, the Japanese rural areas as they are, may more readily adapt the improved sericulture using dried mulberry leaves leading to an increase in cocoon crop. Also the use of artificial feeds including the powder of dried mulberry leaves added with another raw feed material or materials permits a cocoon crop to much increase for unit area of the associated mulberry farm. In addition, it will be apparent that, as auxiliary means for the silkworm rearing relying upon fresh mulberry leaves, such artificial feeds are useful for rearing young silkworms in the frost season, replenishing a shortage of mulberry leaves on the end portion of the larval period or at the fifth instar stage or rearing silkworms in the "off-season."

Since about ten years ago, artificial feeds for the silkworm continue to be studied with respectable results. At present it is prevailing said that the optimum artificial feed is what contains a powder of dried mulberry leaf in the order of 50% based on the total weight of the feed. It has been reported that those artificial feeds including about 50% by weight of dried mulberry leaves in the form of a powder added with soybean and others provide fairly satisfactory records of rearing. Further it has been reported that even a decrease in content of powdered mulberry leaf to 20% gives good results. In addition, artificial feeds containing no powder of mulberry leaf have been developed and reported to be more or less effective for silkworm rearing.

Reviewing the records obtained with those artificial feeds used to rear domestic silkworms, it is appreciated that the higher the content of powdered mulberry leaf the better the result will generally be. Also some of those records describes that in certain instances, the artificial feeds are scarcely different from fresh mulberry leaves in cocoon crop. However, by using these artificial feeds to repeat the silkworm rearing it can be appreciated that the resulting records are generally inferior to those caused from the use of fresh leaves. More specifically, the records of silkworm rearing using the artificial feeds greatly vary from one to another batch. For this reason or other reasons, there has not yet been learned the fact that conventional artificial feeds have been actually utilized by sericulturists.

Conventional artificial feeds for domestic silkworms are outstandingly disadvantageous in that the silkworms are frequently uneven in growth, and that this uneveness of growth tends to be progressively pronounced as the grown stage is reached. In addition, the growth of the silkworms are greatly affected by the inexpertness of rearing. Therefore it has been previously required to effect carefully and skillfully the silkworm rearing in the case artificial feeds are employed. Furthermore, as compared with the use of fresh mulberry leaves, the silkworm rearing using artificial feeds has the tendency to prolong that portion of larval period in which silkworms are still young or the duration of the first, second and third instar stages while shortening the remaining portion thereof or the duration of the fourth and fifth instar stages with the result that the average weight of cocoons and/or that of cocoon shells can frequently decrease. Also the larval period is not only longer for artificial feeds than for fresh mulberry leaves but also a fluctuation of time at which caterpillars are pupated is, in many cases, appreciably large.

The disadvantages of the conventional artificial feeds as above described results partly from those raw feed materials other than the mulberry leaf contained in the feeds, for example, the powder of soybean previously employed is not necessarily suitable for growing domestic silkworms. It has been already known that the soybean includes a growth inhibitor for silkworms.

SUMMARY OF THE INVENTION

Accordingly, it is an object of the invention to provide a new and improved artificial feed composition for domestic silkworms substanitally equal in effectiveness to fresh mulberry leaves.

The invention accomplishes this object by the provision of an artificial feed composition for rearing domestic silkworms, consisting essentially of an artificial feed per se well known and a unicellular green alga belonging to chlorococcales in an amount of at least 30% based on the total weight of the composition.

The unicellular green alga may be preferably selected from chlorellas or from scenedesmuses.

DESCRIPTION OF THE PREFERRED EMBODIMENTS

The invention is based upon the discovery that certain algae are effective for artificially rearing domestic silkworms. It has been found that the effectiveness of those algae principally results from the fact they include ingredients suitable for growing domestic silkworms. More specifically, since such algae themselves are of the alive cell, they more approximate the fresh mulberry leaf than conventional raw feed materials forming the artificial feed and also are more enriched in proteins, saccharides, lipids, vitamins, minerals and other unknown growth promoters than powdered soybean.

It has been also found that unicellular green algae belonging to chlorococcales are optimum. Suitable examples of these unicellular green algae involve chlorellas, scenedesmuses etc. The results of numerous experiments have indicated that the alga should be included in the artificial feed composition in an amount of at least 30% and preferably of from 50 to 80% based on the total weight of the composition. If the content of the alga is less than 30%, the resulting composition does not give the desired result.

The artificial feed for use with the invention may be of any conventional composition and may usually include from 20 to 50% by weight of powdered mulberry leaf, and appropriate amounts of green soybean, exoleated soybean, celluloses etc. in the form of powders. If desired, the content of powdered mulberry leaf may be as low as 10% or as high as 60% based upon the total weight. Also the conventional artificial feeds may include casein and/or starch.

Further an artificial feed involved is preferably free from powdered celluloses. If desired, vitamins, saccharides, lipids, antioxidants, sterols, minerals, antiseptics may be added to the present feed.

The most typical example of the conventional artificial feeds may include a composition consisting essentially (A) of 5.5 grams of powdered mulberry leaf, 2.5 grams of powdered green soybean, 1.0 gram of starch, 0.5 gram of glucose or grape sugar and 0.15 gram of vitamin C or (B) of 2.5 grams of powdered mulberry leaf, 3.7 grams of powdered, exoleated soybean, 3.7 grams of powdered cellulose, 0.2 gram of vitamin C, 0.02 gram of sterol and 0.02 gram of a mixture of vitamin B's.

An artificial feed including the composition (A) or (B) as above described is generally mixed to an aqueous solution containing from 0.5 to 2% by weight of agar-agar in an amount corresponding to three times the weight of the feed for silkworm rearing. Upon practicing the invention, a selected one of the unicellular algae is, as a rule, substituted for any one or more of the ingredients other than the powdered mulberry leaf of the composition as above described. If desired, the powdered mulberry leaf may be partly replaced by the alga. In the latter case, it is preferable that the content of powdered mulberry leaf is not less than 20% based on the weight of the resulting feed. The alga in the form of a dried powder may be preliminarily added to any or all of the ingredients of the feed. Alternatively it may be directly added to the feed upon preparing the latter.

In order to demonstrate the effectiveness of the invention, a chlorella (*Chlorella regularis*) was added to the conventional compositions (B) in an amount of from 10 to 90% on the basis of the total weight of the resulting feed with an incremental content of 10% of the chlorella with soybean maintained equal in weight to cellulose. For the content of the chlorella equal to or higher than 80%, the chlorella substituted for a part of the mulberry leaf. Then the artificial feeds thus prepared were used to rear the silkworms. The results of those rearing are listed in the following Table I.

TABLE I

| Content of chlorella in percent | 10 days[1] Avg. wt. in gs. | 10 days[1] Propn. of 4th instar larval in percent | 15 days[1] Avg. wt. in gs. | 15 days[1] Propn. of 5th instar larval in percent | 20 days[1] Avg. wt. in gs. | 20 days[1] Pupation in percent | Avg. larval period in days | Avg. wt. on maturity in gs. | Time bet. first and last pupations in days | Spinning in percent | Propn. of accepted cocoons in percent | Avg. wt. of cocoon in gs. | Avg. wt. of cocoon shell in gs. | Wt. ratio of cocoon to its shell in percent |
|---|---|---|---|---|---|---|---|---|---|---|---|---|---|---|
| 0 | 0.13 | 0.0 | 0.42 | 0.0 | 1.22 | 0.0 | 27 | 2.9 | 4 | 85 | 85 | 1.20 | 0.23 | 19.2 |
| 10 | 0.13 | 5.0 | 0.42 | 0.0 | 1.23 | 0.0 | 27 | 2.9 | 4 | 83 | 80 | 1.23 | 0.22 | 17.8 |
| 20 | 0.14 | 20.0 | 0.50 | 0.0 | 1.44 | 0.0 | 26 | 3.0 | 4 | 93 | 85 | 1.28 | 0.23 | 18.0 |
| 30 | 0.15 | 67.5 | 0.71 | 7.5 | 2.98 | 0.0 | 22 | 3.2 | 3 | 93 | 83 | 1.30 | 0.26 | 20.0 |
| 40 | 0.24 | 80.0 | 0.76 | 62.5 | 3.42 | 15.0 | 21 | 3.7 | 2 | 98 | 90 | 1.49 | 0.30 | 20.1 |
| 50 | 0.30 | 82.5 | 1.41 | 72.5 | 3.80 | 52.5 | 21 | 4.3 | 2 | 93 | 93 | 1.55 | 0.33 | 21.1 |
| 60 | 0.33 | 100.0 | 1.48 | 85.0 | 4.11 | 50.0 | 21 | 5.2 | 2 | 98 | 93 | 1.59 | 0.32 | 20.1 |
| 70 | 0.37 | 92.5 | 1.60 | 92.5 | 4.20 | 72.5 | 21 | 4.5 | 2 | 95 | 93 | 1.69 | 0.33 | 19.5 |
| 80 | 0.43 | 100.0 | 1.91 | 87.5 | 4.26 | 67.5 | 21 | 4.9 | 3 | 95 | 95 | 1.63 | 0.28 | 17.2 |
| 90 | 0.31 | 35.0 | 1.26 | 37.5 | 4.07 | 27.5 | 21 | 5.1 | 3 | 70 | 60 | 1.74 | 0.30 | 17.3 |

[1] Remark: The counting of the days started with the beginning of silkworm rearing.

From the above Table I, it can be seen that the feed containing the chlorella in an amount of 30% or more causes the growth of silkworms to be much accelerated and a great decrease in the larval period. Also the pupation occurs with a relatively high uniformity while the cocoon weight and the cocoon-shell weight are increased with a high proportion of the accepted cocoons. Thus the Table I indicates that the chlorella has a threshold of concentration above which nutriments involved are effectively operative on the silkworms. That is, the threshold has a value of 30% based on the total weight of the feed.

Also it has been found that other types of chlorellas and scenedesmuses give the results similar to those as listed in Table I.

The invention has several advantages over the conventional artificial feeds. For example, the present feed is less in putrefaction. Young silkworms take strongly food to be rapidly grown and vigorously move with their skin grossy. Thus the young silkworms are healthy and uniformly grown resulting in the very easy rearing. Further the invention fully eliminates the disadvantage of the prior art practice that as grown silkworms are reached their growth becomes irregular and rather has the tendency to cause the silkworms to be uniformly grown as the rearing proceeds. As a result, the pupation occurs with a relatively high uniformity. In addition, the beginning portion of the larval stage is short while the last portion thereof is long. This resembles the process of growth found in the fresh leaf rearing. Pupae transformed from the silkworms do not scarcely spin cocoons and only a small number of the resulting cocoons is thin-walled, resulting in a high yield of accepted cocoons. Furthermore, the results of rearing are less different from one to another experimental batch.

What we claim is:

1. An artificial feed composition for rearing domestic silkworms, consisting essentially of 30 to 90% by weight of chlorella, 10 to 50% by weight of powdered mulberry leaf, powdered exoleated soybean, powdered cellulose, Vitamin C, sterol and a mixture of Vitamin B's.

2. The composition according to claim 1, containing 50 to 80% by weight of chlorella.

References Cited

UNITED STATES PATENTS

| | | | |
|---|---|---|---|
| 3,328,170 | 6/1967 | Hamamura et al. | 119—6 |
| 3,488,196 | 1/1970 | Niimura et al. | 99—2 |
| 3,230,930 | 1/1966 | Hamamura et al. | 119—6 |

FOREIGN PATENTS

| | | |
|---|---|---|
| 11,095 | 4/1970 | Japan. |
| 5,015 | 2/1970 | Japan. |
| 2,050 | 1/1970 | Japan. |

OTHER REFERENCES

S. Arakawa et al., Chemical Abstracts, vol. 65, 1962, 17157F.

V. Lautner, Chemical Abstracts, vol. 66, 1967, 17427e.

E. Kofranyi, Chemical Abstracts, vol. 72, 1970, 87667F.

N. Wai, Chemical Abstracts, vol. 52, 1957, 2192c.

NORMAN YUDKOFF, Primary Examiner

C. P. RIBANDO, Assistant Examiner

U.S. Cl. X.R.

119—6; 426—210